United States Patent
Lii et al.

(10) Patent No.: US 12,552,023 B2
(45) Date of Patent: Feb. 17, 2026

(54) METHOD FOR CONTROLLING A ROBOT, AND SYSTEM

(71) Applicant: Deutsches Zentrum für Luft- und Raumfahrt e.V., Bonn (DE)

(72) Inventors: Neal Lii, Bonn (DE); Aaron Pereira, Bonn (DE); Benedikt Pleintinger, Bonn (DE); Annika Schmidt, Bonn (DE)

(73) Assignee: Deutsches Zentrum Für Luft- und Raumfahrt e.V., Bonn (DE)

( * ) Notice: Subject to any disclaimer, the term of this patent is extended or adjusted under 35 U.S.C. 154(b) by 201 days.

(21) Appl. No.: 17/920,307

(22) PCT Filed: Apr. 16, 2021

(86) PCT No.: PCT/EP2021/059884
§ 371 (c)(1),
(2) Date: Nov. 2, 2022

(87) PCT Pub. No.: WO2021/213911
PCT Pub. Date: Oct. 28, 2021

(65) Prior Publication Data
US 2024/0286279 A1    Aug. 29, 2024

(30) Foreign Application Priority Data
Apr. 24, 2020    (DE) .................... 10 2020 111 179.7

(51) Int. Cl.
| | |
|---|---|
| B25J 9/16 | (2006.01) |
| B25J 13/02 | (2006.01) |
| G06F 3/01 | (2006.01) |

(52) U.S. Cl.
CPC .......... B25J 9/1633 (2013.01); B25J 9/1689 (2013.01); B25J 13/025 (2013.01);
(Continued)

(58) Field of Classification Search
CPC ...... B25J 9/1633; B25J 9/1689; B25J 13/025; G05B 2219/40131; G06F 3/011; G06F 3/014; G06F 3/016
See application file for complete search history.

(56) References Cited

U.S. PATENT DOCUMENTS

| | | | |
|---|---|---|---|
| 6,042,555 A * | 3/2000 | Kramer | G06F 3/014 |
| | | | 600/595 |
| 7,027,031 B2 | 4/2006 | Kawaski et al. | |

(Continued)

FOREIGN PATENT DOCUMENTS

| | | |
|---|---|---|
| DE | 43 32 580 A1 | 3/1995 |
| DE | 10 2017 220996 A1 | 5/2019 |

(Continued)

OTHER PUBLICATIONS

Schmidt, A., et al., "Enabling Interaction with Virtual Fluids and Mixed Media using a High Dexterity Hand Exoskeleton," Oct. 2020, 2020 IEEE International Conference on Systems, Man, and Cybernetics (SMC), pp. 2925-2932 (Year: 2020).*

(Continued)

*Primary Examiner* — Abby Lin
*Assistant Examiner* — Karston G. Evans
(74) *Attorney, Agent, or Firm* — Dickinson Wright PLLC

(57) ABSTRACT

A method for controlling a robot, in which a force and/or movement of a user is transferred to at least one actuated segment of the robot and is detected by the robot in order to control a solid in a fluid, wherein the force and/or movement of the user is transferred to the solid, wherein the actuated segment generates a movement and/or force in dependence of the solid as haptic feed-back, and wherein, in order to determine the force generated by the actuated segment, a fluid force vector is determined which includes the influence (Continued)

of the fluid on the solid, and a solid force vector is determined which includes the influence of the solid.

16 Claims, 2 Drawing Sheets

(52) U.S. Cl.
CPC .... *G05B 2219/40131* (2013.01); *G06F 3/011* (2013.01); *G06F 3/014* (2013.01); *G06F 3/016* (2013.01)

(56) References Cited

U.S. PATENT DOCUMENTS

| | | | |
|---|---|---|---|
| 7,039,866 | B1 | 5/2006 | Rosenberg et al. |
| 9,052,710 | B1* | 6/2015 | Farwell ................. G05B 19/423 |
| 2003/0146898 | A1 | 8/2003 | Kawasaki et al. |
| 2008/0046226 | A1 | 2/2008 | Massie et al. |
| 2011/0084943 | A1 | 4/2011 | Berkley et al. |
| 2013/0278500 | A1 | 10/2013 | Kawasaki et al. |
| 2014/0320629 | A1* | 10/2014 | Chizeck .................. G06T 15/04 348/81 |
| 2017/0121129 | A1 | 5/2017 | Mylonas et al. |
| 2017/0322629 | A1* | 11/2017 | Pirasmepulkul ...... G06F 3/0346 |
| 2018/0256271 | A1* | 9/2018 | Tojo ...................... B25J 9/1664 |
| 2019/0358817 | A1* | 11/2019 | Ghazaei Ardakani ....................... B25J 9/1689 |
| 2019/0380798 | A1 | 12/2019 | Itkowitz et al. |
| 2020/0012345 | A1 | 1/2020 | Wang et al. |
| 2021/0059780 | A1* | 3/2021 | Sutherland ............. A61B 34/37 |

FOREIGN PATENT DOCUMENTS

| | | | |
|---|---|---|---|
| EP | 2422939 B9 * | 10/2013 | ............. G06F 3/011 |
| EP | 2 743 801 B1 | 3/2020 | |
| JP | 2011 238069 A | 11/2011 | |
| WO | WO-0118617 A1 * | 3/2001 | ............. A61B 34/76 |

OTHER PUBLICATIONS

Yang, M., et al., "GPU methods for real-time haptic interaction with 3D fluids," Nov. 2009, 2009 IEEE International Workshop on Haptic Audio visual Environments and Games, pp. 1-6 (Year: 2009).*

Cirio, G., et al., "Six-dof haptic interaction with fluids, solids, and their transitions," 2013, IEEE World Haptics Conference 2013, pp. 157-162 (Year: 2013).*

Mora, J., Lee, W., "Real-Time 3D Fluid Interaction with a Haptic User Interface," 2008, IEEE Symposium on 3D User Interfaces 2008, pp. 75-81 (Year: 2008).*

* cited by examiner

METHOD FOR CONTROLLING A ROBOT, AND SYSTEM

The present invention relates to a method for controlling a robot for generating a force feedback for simulating a fluid, as well as to a corresponding system.

In previous years, the focus of the interaction with virtual environments was on the haptic representation of solids by force feedback. However, in exploring real environments, e.g. by teleoperation, the interaction with other media such as liquids or fluids is also relevant. Up to now, the use of force feedback systems merely enables an inaccurate representation of viscosity, which enables a user to perceive virtual liquids only insufficiently. In prior art as of today, viscosity is represented or modeled only by means of haptic systems which calculate forces at a single end point. This is disadvantageous in that the possibilities of interaction with liquids are limited to simple movements. These include for example simple applications such as stirring with a rod or swiveling a filled container. In addition, in prior art, the viscosity of liquids is calculated only at a low update rate (30-500 Hz) [1-5]. At this lower update rate, it is not possible to obtain an interaction with virtual solids, whereby significant limitations occur for the user.

It is an object of the present invention to provide a method and a system which enable a realistic simulation of fluids.

The object is achieved with a method according to claim 1 and a system according to claim 12.

The method for controlling a robot according to the invention comprises the following steps: detecting a force and/or a movement of a user applied onto at least one actuated segment of the robot, the force and/or movement being detected by the robot to control a solid in a fluid, the force and/or movement of the user being transferred onto the solid. The actuated segment is in particular an actuator for detecting in particular the force and the position of the actuated segment. At the same time, a force and/or a movement can be generated by the actuated segment and be subsequently transmitted to the user. Here, at least one limb of the user is connected with the actuated segment. The limb may be one finger, several fingers or all fingers of one hand, an arm or a leg. Here, the actuated segment is connected with the limb of the user through an endpoint. In particular, the solid is a real object or an object in a virtual reality. This may be a single object or a combination of a plurality of objects. The solid may be, for example, an end effector of a robot arm in a teleoperation in combination with or without an object grasped by the end effector or connected with the end effector in any other way. Here, the end effector can be a robotic hand, i.e. a robotic replication of a human hand. However, other possibilities of designing the end effector are also encompassed. As an alternative, the solid is a hand or a limb of an avatar in a virtual reality in combination with or without an object grasped by the hand of the avatar or connected with the hand or limb of the avatar in any other way. Here, the solid is arranged at least in part in a fluid, comprises a fluid (e.g. as a receptacle holding a liquid), or the movement or cinematics is at least influenced by the fluid and in particular by the viscosity and the flow characteristics of the fluid. Thus, the force and/or the movement of the user is detected by the robot and is used to control a solid e.g. in a virtual reality or, as an alternative, as a teleoperation for controlling another robot.

According to the invention, the actuated segment generates a movement and/or force in dependence on the solid as a haptic feedback which is also referred to as force feedback. For determining the force and/or movement generated by the actuated segment as a haptic feedback, a fluid vector is determined which includes the influence of the fluid on the solid. Furthermore, a solid force vector is determined which includes the influence on the haptic feedback of the solid as such. The force and/or movement thus determined is then transmitted from the actuated segment to the limb of the user via the at least one endpoint in order to generate the haptic feedback. Thus, a complex interaction with and in liquids is made possible which allows a better examination of unknown environments in teleoperation scenarios or virtual realities. An environment can be simulated in which both reaction forces of solids can be represented, and the viscosity of a medium can be detected and be made perceptible to the user. Thus, not only the interaction with rigid objects is possible, but it is also possible to identify and examine media with different viscosities such as water or sludge in a teleoperation, using a slave system.

The fluid force vector is preferably determined with a frequency of more than 500 Hz, in particular more than 1000 Hz. In particular, the fluid force vector is determined at the same rate as the solid force vector. Due to the high update frequencies it is possible to achieve a precise simulation of the forces for the haptic feedback and to thus obtain a precise feeling for the environment of the controlled solid.

Preferably, the robot detects a plurality of forces and/or movements of in particular a plurality of limbs of the user for transfer to the solid. In particular, the force and/or movement of one or more fingers of the hand as the limb of the user is detected. In particular, for each detected limb, at least one actuated segment of the robot exists to detect the force and/or movement of the respective limb. Here, each actuated segment defines an endpoint at which the movement and/or the force of the respective limb is detected and simultaneously transferred to the limbs of the user in the context of force feedback. By using a plurality of endpoints which are represented by the actuated segments of the robot, ambient viscosities can also be represented and perceived by the user, besides the characteristics of the solid. In such an application, it is not only possible to represent an approximation of the viscosity based on the resistance relative to the solid itself, but it is also possible to simulate additional interferences such as waves, for example. Such a simulation could be used for training divers or astronauts (for example, also in virtual reality) and could thus reduce the cost of expensive training. Thus, an individual force feedback can be given by the respective endpoints, realized by the actuated segments of the individual limbs of the user.

Preferably, for each limb, the robot detects the position and/or velocity and/or orientation as movement parameters. In particular, for the detection of the orientation, an additional connection with the palm and/or the arm of the user can be made in order to detect a relative position of the fingers to the palm or of the fingers to the arm. In this context, reference is made in particular to an implementation by an exoskeleton, described in German Patent Application DE 10 2017 220 996.8 by the present applicant.

Preferably, a characteristic length is determined from the movement parameters, in particular separately for each limb. Here, the characteristic length is the projection of the solid onto the relative flow velocity between the solid and a fluid.

Preferably, a total fluid force is determined from the detected movement parameters and/or application parameters and/or the respective characteristic length. Here, the application parameters may be the viscosity of the fluid, material properties, the shape and the like of the solid. A resistance and buoyancy force is determined by the total fluid force.

Preferably, a proportionate force distribution of the total fluid force to the individual limbs is determined from the movement parameters. Thus, the previously determined total fluid force is used and subsequently divided so that the haptic feedback can be distributed to a plurality of endpoints or limbs of the user in order to ensure a precise modeling of the solid in the fluid and to also enable a precise manipulation of the solid in the fluid.

Preferably, direction vectors are determined for each limb from the sensor data, which vectors indicate the direction of action of the force. Thus, by the actuated segments not only magnitudes of force, but also a dedicated direction of force, in particular for each limb, as haptic feedback to the respective limbs and in particular each individual finger of a hand can be transferred. Thus, the directions of force, which are different for the individual limbs, can be used to obtain a realistic simulation of the environment of the solid.

Preferably, at least a part of the total fluid force is transferred directly to the arm. For this purpose, it is necessary that at least one actuated segment is connected with the arm and/or the palm to transfer the portion of the total fluid force. In this way, it is possible to represent ambient viscosities and to thereby perceive the viscosity of the fluid by moving the arm in the fluid.

Preferably, the solid force vector is transferred only to the individual fingers and not to the arm. Thus, the haptic feedback/experience of the solid is transferred exclusively to the fingers. Of course, this does not exclude that parts of the total fluid force are transferred to the fingers. For example, the touch haptics of the solid can be transferred to the fingers. Upon a movement of the solid in the fluid, the viscous forces are additionally transferred to the fingers. For example, upon a rotation of the solid.

Preferably, an additional vibration is generated by the robot and in particular the actuated segments for transfer to the limbs of the user, the vibration causing a haptic simulation of granulates or solid/liquid mixtures. Here, the amplitude and the frequency of the vibration can be adapted to the granular size of the granulates or the like.

The present invention further relates to a system for detecting and transferring a force and/or movement comprising a robot having at least one actuated segment. The at least one segment thus comprises an actuator for generating a force and/or movement. In particular, it is a six-axis robot arm. Further, the actuated segments can be designed as an exoskeleton as described in DE 10 2017 220096.8. Furthermore, at least one connection point is provided between the at least one actuated segment and the at least one limb of the user as the endpoint, so that a force and/or movement of the user is transferred to the robot. At the same time, the connection at the endpoint enables the transfer of a force and/or movement from the robot to the limb of the user as a haptic feedback or force feedback. According to the invention, the robot is connected with a control device, the control device being configured to perform the method as described above.

Preferably, the at least one segment and in particular all segments comprise position detection and preferably force detection for the detection of forces and/or movements.

Preferably, at least one finger is connected with an actuated segment. In particular, each finger of a hand of the user is connected with an actuated segment, respectively, so that a dedicated endpoint is defined for each finger of a hand.

Preferably, the robot has an exoskeleton for connecting the hand of the user and in particular for connecting the arm of the user. Here, the exoskeleton can be designed preferably as described in the Patent Application DE 10 2017 220 096.8 by the present applicant.

Preferably, an actuated segment of the robot is connected with the palm and/or an actuated segment is connected with the arm of the user to detect the position relative to the fingers and to detect a force and/or movement.

In the following, the invention is described in more detail by means of a preferred embodiment with reference to the accompanying drawings.

Figure 1:
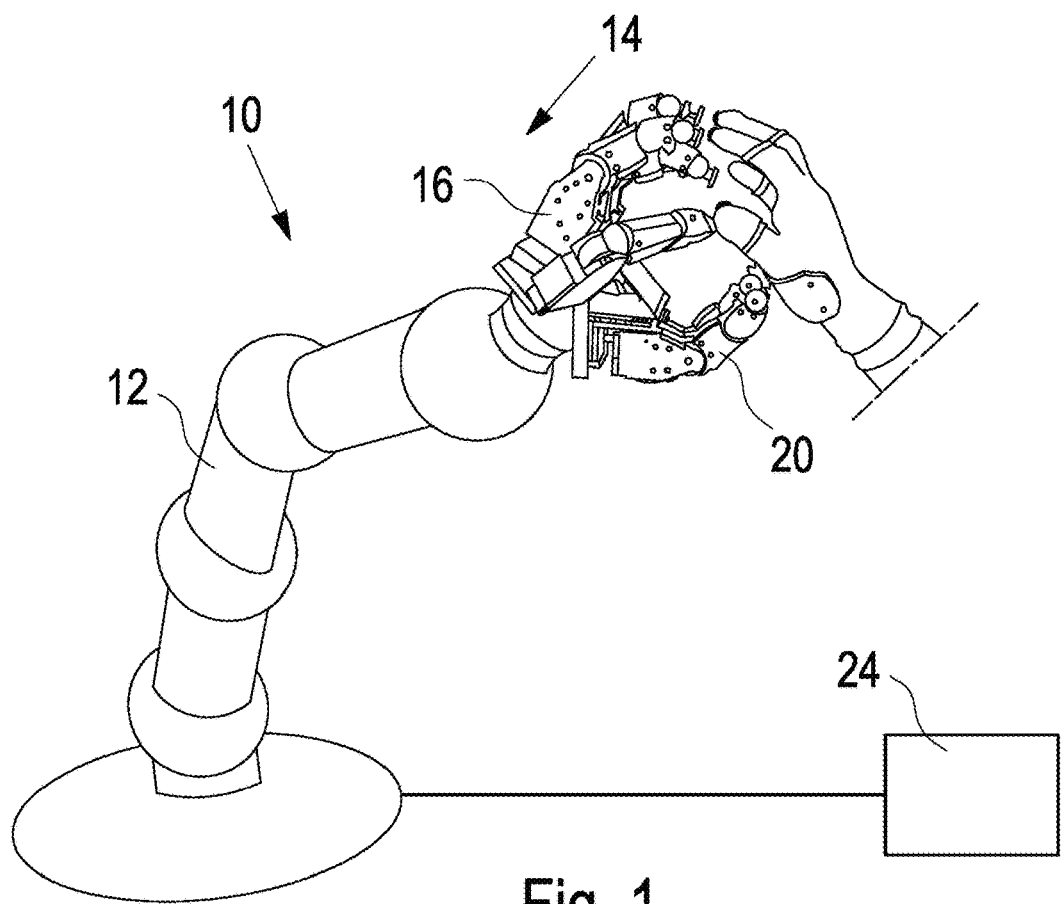
FIG. 1 shows an embodiment of the system according to the invention.

FIG. 1 shows the robot 10 with a six-axis robot arm 12. An exoskeleton 14 as known from Patent Application DE 10 2017 220 096.8 is arranged at the end of the robot arm 12. Here, the exoskeleton 14 comprises a plurality of actuated segments 16. Here, each actuated segment 16 can be connected with a finger 18 of the user at a respective endpoint 21 of the exoskeleton 14, so that a force and/or movement of the finger 18 of the user can be transferred to the exoskeleton, is detected by the same and is transferred to an object/solid to be controlled in the course of a teleoperation or within a virtual reality for control. At the same time, the actuated segments 16 transfer forces and/or movements to the respective fingers 18 of the user at the endpoint 21 to generate a haptic feedback, so that influences on the object to be controlled are fed back to the user and thereby become perceptible. Moreover, it is evident from FIGS. 1 and 2 that the exoskeleton 14 comprises actuated segments 20 that are connected with the palm or the arm 22 of the user. In this way, a position and orientation of the fingers 18 of the user, and in particular of the entire hand, become completely detectable by the robot 10.

Figure 2:
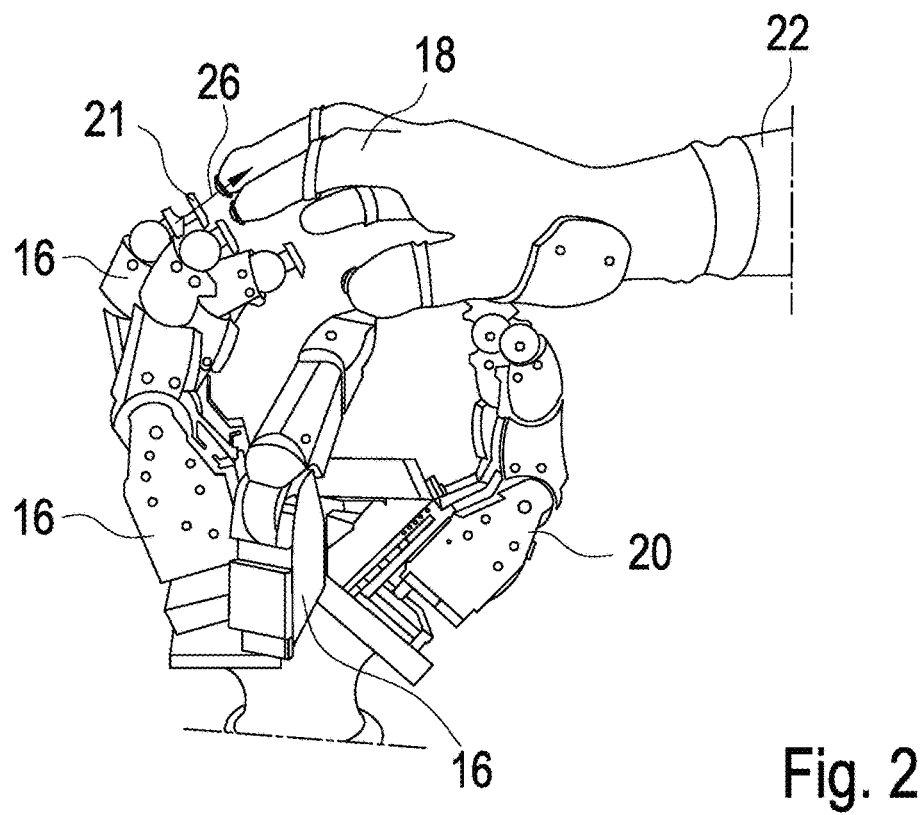
FIG. 2 shows a detail of the exoskeleton, as well as of the hand of the user in FIG. 1.

Further, according to the invention, the robot 10 is connected with a control device 24 for controlling the robot. Here, the control device 24 is configured to make in particular influences of a fluid on the object to be controlled and/or a solid perceptible as a force feedback by a feedback. Here, the control device 24 calculates a proportionate and individual force for each end-point 21, which force is transferred to the respective finger 18 and is generated by influences of the fluid on the solid. The actuated segments 20 connected with the arm 22 can transfer an ambient viscosity to the arm which is experienced, for example, when the arm is pulled through a fluid. The individual forces at the respective endpoint 21 are illustrated in FIG. 2 for the middle finger by means of the arrow 26, as an example. The procedure is the same for all other fingers of the hand that are connected with a respective actuated segment.

Figure 3:
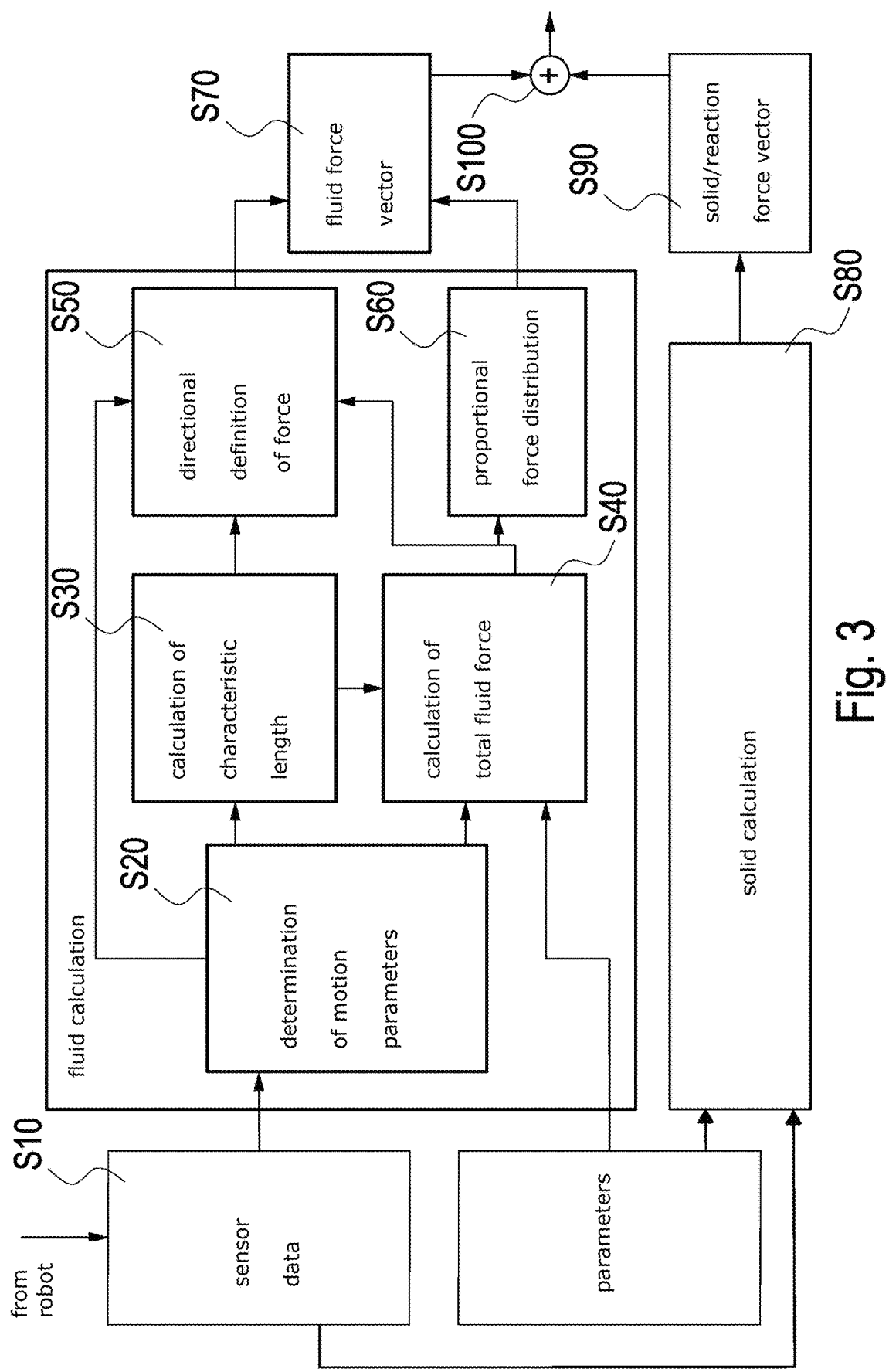
FIG. 3 shows a schematic flow chart of the method according to the invention.

FIG. 3 is an exemplary illustration of the method according to the invention. The robot detects sensor data regarding the force and/or the movement/position of the arm, the hand and/or the fingers or another limb of the user S10. The position, velocity and/or orientation of the respective limb are determined therefrom S20. A characteristic length of the respective limb is calculated from the thus determined movement parameters S30.

Moreover, application parameters are known which include the viscosity or granularity of the fluid, the shape of the solid or the object to be controlled and the like. A total fluid force is calculated from the application parameters and the movement parameters S40. The total fluid force as well as the movement parameters and the characteristic length of the respective limbs are used to define the direction, i.e. the direction of action of the force on the individual limbs S50. Moreover, a proportionate force distribution to the individual limbs is determined from the total fluid force S60. Thus, it is possible to determine a perceptible force individually for each endpoint 21 or for each limb in order to achieve a precise simulation of the behavior of the solid in the fluid. From the definition of the direction of the force and from the proportionate distribution of force, a fluid force vector is calculated separately for each limb, the fluid force vector being transferred to the respective limb at the respective endpoint 21 S70.

Parallel to the calculation of the fluid, a calculation of the solid is performed S80, so that the influence of the solid on the force to be perceived can be determined within the haptic feedback. A solid force vector is determined therefrom S90. The fluid force vector and the solid force vector are combined S100 and are transferred to the actuated segments as haptic force feedback.

Thus, a simple and quick simulation of the influence of a fluid on an object to be controlled in a teleoperation application or in a virtual reality is ensured. In particular, the update frequencies for the calculation of the fluid can be selected higher than 500 Hz, so that a precise simulation becomes possible.

The invention claimed is:

1. A method for controlling a robot, the method comprising:
   detecting at least one of a force or a movement of one or more limbs of a user by at least one actuated segment of the robot to control at least one of a real or virtual solid in a fluid, at least one of the force or the movement of the user being transferred to the solid;
   determining movement parameters from the detected force or movement of the user limb, wherein the movement parameters comprise at least one of position, velocity, and orientation of the limb;
   determining a characteristic length of the user limb using the movement parameters;
   using an application parameter, determining a total fluid force, wherein the application parameter includes only a viscosity of the fluid;
   using the total fluid force, the movement parameters, and the characteristic length, determining a direction of action of the total fluid force on each of the one or more limbs;
   using the total fluid force, determining a proportionate force distribution to each of the one or more limbs;
   using the direction of action of the total fluid force on each of the one or more limbs, the proportionate force distribution to each of the one or more limbs, and an influence of the fluid on the solid, determining a fluid force vector transferred to each of the one or more limbs;
   using an influence of the solid, determining a solid force vector;
   combining the solid force vector and the fluid force vector as a haptic feedback force; and
   transferring the haptic feedback force to the one or more limbs via the at least one actuated segment of the robot;
   wherein the actuated segment generates at least one of a movement or force in dependence on the solid.

2. The method according to claim 1, wherein the fluid force vector and the solid force vector are determined using a same detection rate of more than 500 Hz.

3. The method according to claim 1, in which the robot detects at least one of a plurality of forces or movements of at least one of a plurality of fingers and at least one palm or arm of the user for transfer to the solid and transfers the at least one of the plurality of forces or movements as haptic feedback to the plurality of fingers and at least one palm or arm in dependence on the solid.

4. The method according to claim 3, in which, for each finger, the robot detects at least one of the position or velocity or orientation as movement parameters.

5. The method according to claim 4, in which a characteristic length is determined from the movement parameters for each finger.

6. The method according to claim 1, in which at least a portion of the total fluid force is transferred directly to a palm or an arm of the user.

7. The method according to claim 1, in which the solid force vector acts exclusively on individual fingers of the user.

8. The method according to claim 1, in which a vibration is generated by the robot for transfer to the limbs of the user for haptic simulation of granulates or solid-liquid mixtures.

9. A system for detecting and transferring at least one of a force or a movement, comprising:
   a robot, including a 6-axis robot arm and the at least one actuated segment;
   at least one connection endpoint disposed between the at least one actuated segment and the at least one limb of the user, so that at least one of a force or movement of the user is transferred to the robot, and vice versa; and
   a control device connected with the robot, wherein the control device is configured to perform the method according to claim 1.

10. The system according to claim 9, wherein the at least one actuated segment comprises at least one of a position detector and a force detector.

11. The system according to claim 9, wherein the at least one limb of the user comprises at least one finger connected with the at least one actuated segment via the connection endpoint.

12. The system according to claim 9, wherein the robot comprises an exoskeleton for connection with the hand of the user, and the exoskeleton comprises the at least one actuated segment.

13. The system according to claim 9, wherein the at least one actuated segment comprises a plurality actuated segments, and at least one of the plurality of actuated segments of the robot is connected with a finger of the user and at least one of the plurality of actuated segments of the robot is connected with an arm or a palm of the user to detect the position of the arm or the palm relative to the fingers and to detect at least one of a force or movement of the finger and the arm or palm.

14. The system according to claim 9, wherein the at least one segment comprises a position detector and a force detector.

15. The system according to claim 9, wherein each actuated segment comprises a position detector and a force detector.

16. The system according to claim 9, wherein each finger of a user's hand is respectively connected with an actuated segment.

* * * * *